US012739133B1

(12) United States Patent
Schneider

(10) Patent No.: US 12,739,133 B1
(45) Date of Patent: Sep. 15, 2026

(54) SYSTEMS AND METHODS FOR THE STAGED DISSEMINATION AND VERIFIABLE CONTEMPORANEOUS RELEASE OF ELECTRONIC DATA

(71) Applicant: Eric Schneider, Hallandale Beach, FL (US)

(72) Inventor: Eric Schneider, Hallandale Beach, FL (US)

( * ) Notice: Subject to any disclaimer, the term of this patent is extended or adjusted under 35 U.S.C. 154(b) by 0 days.

(21) Appl. No.: 19/534,674

(22) Filed: Feb. 9, 2026

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01)

(58) Field of Classification Search
None
See application file for complete search history.

(56) References Cited

U.S. PATENT DOCUMENTS 6,442,549 B1 8/2002 Schneider
9,171,289 B2 10/2015 Kraft et al.
11,556,962 B2 1/2023 Choi
2007/0192127 A1 8/2007 McInnis
2010/0088521 A1 4/2010 Koplow
2011/0197237 A1 8/2011 Turner
2012/0316888 A1 12/2012 Stacey
2015/0161121 A1* 6/2015 Alvarez .............. G06F 16/2255 707/698
2016/0283746 A1* 9/2016 Boshoff ............... H04N 1/4446
2018/0006828 A1 1/2018 Deguchi
2019/0279321 A1 9/2019 Sheets et al.
2025/0260565 A1* 8/2025 Abdelsamie .......... H04L 9/3239

* cited by examiner

*Primary Examiner* — Brandon Hoffman

(57) ABSTRACT

A system and method for the synchronized release of electronic data are disclosed. A staging package comprising an encrypted payload and a verification hash is distributed to a plurality of listening nodes at a first time (T1). The listening nodes stage the payload in an inert state. At a second time (T2), a decryption key is broadcast, enabling the nodes to locally transform the encrypted payload into transformed data and verify its integrity via a bit-level match against the verification hash. In certain embodiments, a listening node apparatus comprises a secure processing environment configured to generate hardware-attested proofs of staging as a prerequisite for transformation. A distribution authority may further utilize a global state engine to programmatically gate access or transactions based on the compliance status of individual nodes, ensuring that the local transformation occurs contemporaneously across the network and according to a coordinated release schedule.

30 Claims, 9 Drawing Sheets

SYSTEMS AND METHODS FOR THE STAGED DISSEMINATION AND VERIFIABLE CONTEMPORANEOUS RELEASE OF ELECTRONIC DATA

FIELD OF THE DISCLOSURE

The present disclosure relates generally to the fields of distributed network architecture, cryptographic data dissemination, and high-precision network synchronization. More specifically, the present disclosure relates to systems and methods for the staged dissemination of encrypted electronic data and the contemporaneous, verifiable transformation of said data across a plurality of distributed nodes based on the coordinated broadcast of a decryption key.

BACKGROUND OF THE DISCLOSURE

Ensuring synchronized information access across multiple parties is fundamentally undermined by network infrastructure. In conventional models, accessibility is tied to transmission timing, creating a sequential delivery pattern that favors recipients with lower latency or closer proximity to the source. This inherent lag creates information asymmetries, which are disruptive in environments requiring the contemporaneous release of financial news, regulatory disclosures, or high-stakes media events. Because network routing speeds vary between every node, geographically dispersed recipients cannot achieve equal footing using standard broadcast methods.

Earlier attempts to bridge these gaps relied on computational puzzles or centralized gatekeeping, both of which introduce distinct failures. Computational time-lock methods are vulnerable to hardware variance; a recipient with superior computing power will inevitably unlock data before others, rendering synchronization moot. Conversely, centralized systems attempting to release data at a specific timestamp suffer from bandwidth bottlenecks. This surge in traffic leads to congestion and server failure, ensuring that data arrival is staggered rather than contemporaneous.

Existing centralized models also consolidate absolute control within the distribution infrastructure. Legacy frameworks frequently achieve synchronization through proprietary control over receiving hardware, where the distributor maintains administrative authority over the end-user terminal. However, in professional B2B environments, the originator is often at the mercy of a service provider's internal protocols and "God-mode" administrative access. These entities maintain persistent control over decryption, creating a singular point of failure. These systems are often optimized for sequential media streams rather than the bit-level integrity required for discrete data objects, and they lack trustless mechanisms to ensure that a compromised actor cannot access or leak content prematurely.

Current workflows also remain susceptible to human fallibility. Manual releases are frequently compromised by unintentional disclosures, such as misconfigured servers or premature publication, resulting in market volatility and erosion of trust. This highlights a fundamental flaw: the entity responsible for data security is often the same entity capable of its accidental exposure. Existing infrastructure provides no mechanism for an originator to "seal" data in a manner programmatically independent of their own or a distributor's subsequent actions.

Current architectures lack a robust mechanism for decoupling physical delivery from cryptographic activation across autonomous nodes. While peer-to-peer networks efficiently move data, they do not provide a framework to stage data in an inert, encrypted state with a verifiable integrity anchor. This gap prevents a pre-distributed package from being transformed into a functional state locally and contemporaneously based on an external release signal. A specific need exists for a trustless solution that allows data to be staged at the network edge, awaiting a mathematically tethered event to enable access and verify the transformed data-removing delivery bottlenecks, human intervention risks, and the requirement for a central authority to hold absolute power over the data or the receiving hardware.

SUMMARY OF THE DISCLOSURE

The present disclosure relates generally to a technical architecture for the high-fidelity, synchronized dissemination of electronic data across distributed networks. More specifically, the disclosure provides a framework for decoupling the high-bandwidth delivery of encrypted information from its cryptographic activation, utilizing a multi-stage temporal gate to ensure contemporaneous data revelation at the network edge. By staging inert payloads prior to a coordinated release event, the system eliminates traditional network-layer bottlenecks and ensures that geographically dispersed nodes achieve a state change in unison, thereby neutralizing the competitive advantages typically associated with network latency.

Through the integration of hardware-isolated trusted execution environments and mathematically tethered release signals, the system provides a zero-trust security model that prevents unauthorized "insider" access or premature disclosure. The architecture further incorporates bit-level integrity verification and decentralized trust anchors to ensure the authenticity of the data remains intact from the point of issuance to the moment of local transformation. This consolidated approach allows for a robust, scalable, and auditably secure environment for the transmission of sensitive or market-moving information.

In one aspect, a system for the synchronized release of electronic data is provided. The system includes a memory storing an encrypted payload and a verification hash derived from an unencrypted version of the encrypted payload, and a processor in communication with the memory and a network interface. The processor is configured to distribute a staging package to a plurality of listening nodes at a first time, the staging package comprising the encrypted payload and the verification hash, and broadcast a decryption key to the plurality of listening nodes at a second time subsequent to the first time. The decryption key enables the listening nodes to locally perform a transformation of the encrypted payload into transformed data and verify the integrity of the transformed data via a bit-level match against the verification hash.

In another aspect, a listening node apparatus for the synchronized transformation of electronic data is provided. The apparatus comprises a network interface configured to receive a staging package at a first time and a decryption key at a second time, and a secure processing environment comprising a secure processor and a secure memory. The secure processing environment is configured to stage an encrypted payload from the staging package in an inert state, transform the encrypted payload into transformed data using the decryption key, and render the transformed data only upon a successful bit-level match against a verification hash received at the first time.

In yet another aspect, a computer-implemented method for the synchronized release of electronic data is provided.

The method includes receiving, at a listening node, an encrypted payload, a verification hash, and a release schedule at a first time; staging the encrypted payload in local memory in an inert state according to the release schedule; and receiving a release signal comprising a decryption key at a second time defined by the release schedule. The method further involves transitioning the encrypted payload from the inert state to a transformed state at the listening node in response to the release signal, wherein the transitioning is performed locally without further retrieval from a distribution server, and wherein the transformed state is verified via a bit-level match against the verification hash received at the first time.

In a further aspect, a non-transitory computer-readable medium is provided comprising instructions that, when executed by a processor of an aggregation platform, cause the processor to: receive an encrypted payload, an attested metadata block, and a verification hash associated with a source identity at a first time; validate the source identity against a persistent public record; monitor a communication channel for a release signal associated with the encrypted payload; and display a result of the transformed payload only if the result passes a bit-level match against the verification hash received at the first time.

In an additional aspect, a computer-implemented method for the secure preparation of a synchronized data release is provided. The method comprises: generating, at an originator node, a verification hash derived from an unencrypted version of a data object; encrypting the data object using a cryptographic key corresponding to a decryption key to generate an encrypted payload; generating a release signal comprising the decryption key; and assembling a staging package comprising the encrypted payload, the verification hash, and a release schedule. The method further involves transmitting the staging package for arrival at a plurality of listening nodes at a first time, wherein the release signal is withheld from the plurality of listening nodes until a second time defined by the release schedule.

The present disclosure provides a robust technical framework that eliminates information asymmetries by decoupling high-bandwidth content delivery from cryptographic activation. The present disclosure facilitates a contemporaneous access model unaffected by network latency or bandwidth bottlenecks through the edge-staging of encrypted payloads. The present disclosure enables a high-precision synchronization environment where geographically dispersed nodes achieve contemporaneous state changes to ensure information arrival is not a competitive factor.

The present disclosure provides an authoritative source-side sealing mechanism for verifiable proof of data integrity prior to distribution. The present disclosure enables an originator to lock the entropy of a data object via a public ledger pre-commitment to prevent post-distribution tampering. The present disclosure ensures sub-millisecond transition speeds through persistent uplinks with integrated heartbeat signals to support high-frequency dissemination environments.

The present disclosure provides a trustless security architecture utilizing mathematically tethered triggers and distributed witness beacons to programmatically prevent premature disclosure. The present disclosure facilitates a release trigger independent of centralized authority by utilizing a decentralized ledger oracle governed by immutable network conditions. The present disclosure ensures no single entity possesses unilateral power to unlock data by distributing trust across a threshold of independent custodians via multiparty key sharding.

The present disclosure provides a resilient distribution ecosystem by incorporating bit-level integrity checks for local authenticity verification at the node. The present disclosure facilitates the secure processing of sensitive information within hardware-isolated environments to shield data from administrative tampering or forensic extraction. The present disclosure enables the cryptographic authentication of data sources via a provenance registry without requiring a direct network connection to the originator. The present disclosure provides for the programmatic tracing of unauthorized secondary dissemination through the generation of uniquely watermarked data versions utilizing subscriber-specific nonces.

The present disclosure provides a scalable framework for multiparty attribution by supporting the integration of distinct digital signatures within a unified staging package. The present disclosure facilitates a flexible verification model allowing disparate release components to be validated against various decentralized or centralized authoritative records. The present disclosure ensures that nodes with superior physical proximity to a distribution source are mathematically neutralized through a normalization flow utilizing verifiable delay functions. The present disclosure enables high-concurrency validation and geographic fencing of massive data volumes at the network edge to enforce jurisdictional boundaries without single-point-of-failure risks.

The present disclosure provides for the cryptographic binding of release signals to verified source identities to enable autonomous authentication of decryption keys. The present disclosure facilitates the anchoring of digital signatures to persistent public records to mitigate the risk of signal spoofing or unauthorized key injection. The present disclosure provides for hardware-level enforcement of identity verification by programmatically inhibiting data activation if a release signal fails to align with pre-committed provenance records. The present disclosure enables the use of existing domain name system infrastructure as a decentralized identity registry for global verification of source authority. The present disclosure further provides a hardware-attested discovery layer that enables the pre-release indexing of electronic data without content disclosure.

The present disclosure provides for the orchestration of complex, multi-node environments through a global state engine configured to harmonize contemporaneous transitions across a distributed network. The present disclosure facilitates the transformation of an inert payload into a verified state transition to ensure that diverse system participants maintain a consistent and synchronized representation of reality. The present disclosure enables the execution of high-stakes industrial or technical operations via a deterministic logic controller bridged directly to a secure processing environment. The present disclosure ensures that physical or logical actions are triggered in unison by bypassing non-deterministic host processing delays to treat a dispersed network of edge devices as a single, synchronized logical organism.

Accordingly, the present disclosure provides a comprehensive technical solution for the synchronized, secure, and verifiable dissemination of electronic data across distributed networks, effectively neutralizing the temporal and security vulnerabilities of conventional broadcast and retrieval methods.

DETAILED DESCRIPTION OF THE DISCLOSURE

Figure 1:
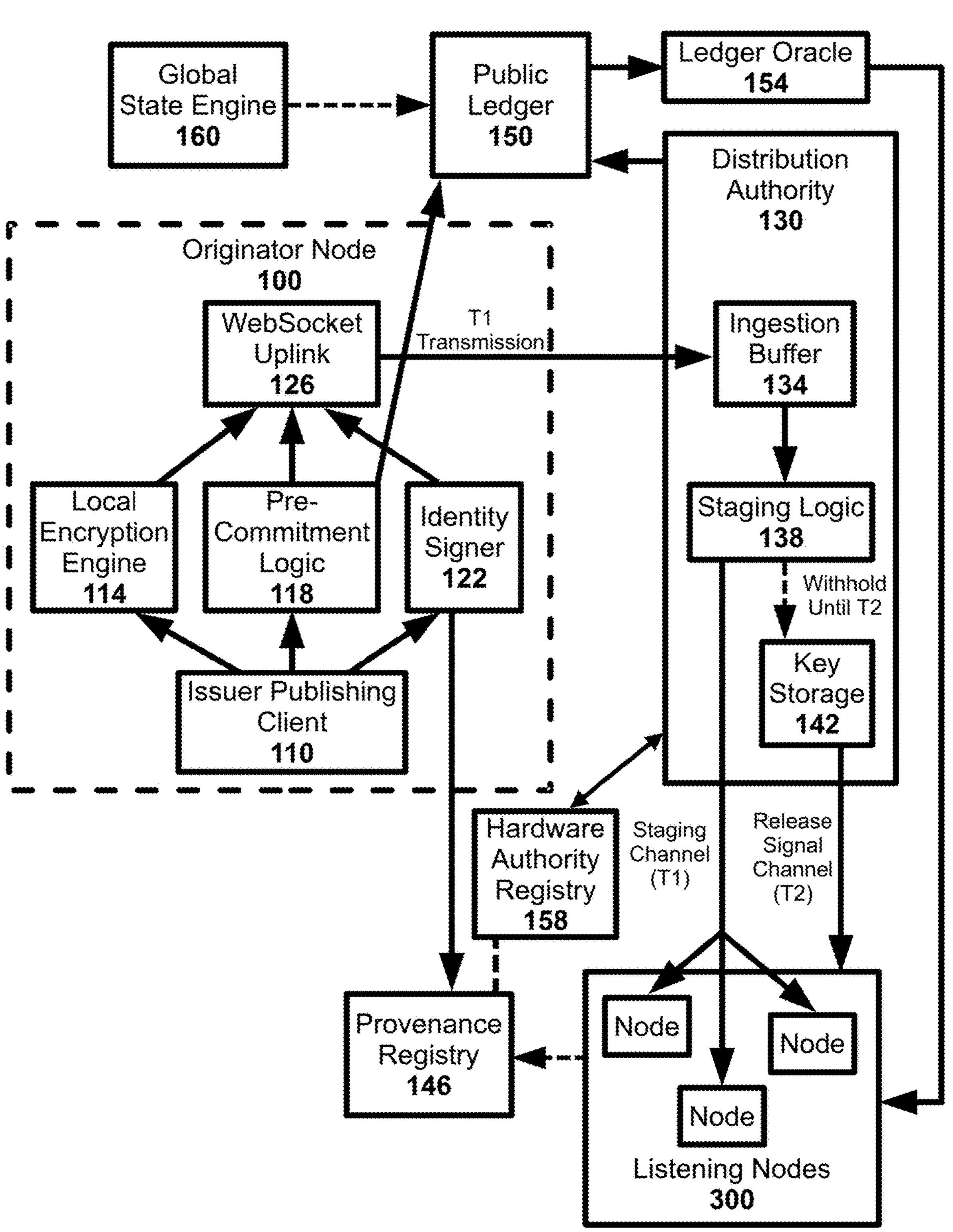
FIG. 1 is a block diagram illustrating a high-level system architecture for the synchronized release of electronic data, including an originator node, a distribution authority, a plurality of listening nodes, and a global state engine, in accordance with the present disclosure.

The present disclosure will now be described with reference to the drawings, wherein like reference numerals are used to refer to like elements disclosed herein.

The following description provides a framework for a high-fidelity, synchronized data release architecture that decouples the dissemination of data from its activation. Unlike traditional distribution systems that rely on network-layer embargoes or simple password protections, the present system utilizes a multi-stage temporal gate-staging an inert, encrypted payload at the network edge prior to a coordinated release signal. This architecture ensures that the moment of data revelation is controlled by a cryptographic key broadcast, rather than by network latency or server-side retrieval speeds. Accordingly, the embodiments described herein are intended to provide a zero-trust environment where the integrity and timing of a data release are verifiable by all participants in the ecosystem, regardless of their location or role.

The Secure Processing Environment, also referred to as a Hardware-Isolated Trusted Execution Environment or Secure Enclave, shall be interpreted broadly to include any hardware-isolated, logically partitioned, or memory-protected execution space. This includes, but is not limited to, TEEs, hardware enclaves, Hardware Security Modules, secure co-processors, or encrypted virtual machine instances where processing is shielded from a host operating system's kernel or users with elevated privileges. The term Transformation is interpreted to include decryption, watermarking, deterministic synthesis, or any programmatic modification of data that transitions it from an inert or unreadable state to a rendered or usable state. An Advertisement Packet is defined as a discrete digital transmission containing at least a machine-readable summary and a hardware-attested proof, intended for public or semi-public indexing prior to a release event.

The System and Distribution Authority are interpreted broadly as one or more computing devices, servers, or distributed network architectures, including cloud-based and decentralized systems, configured to coordinate the ingestion, preparation, and dissemination of data. The Originator Node or Content Originator refers to any computing device, terminal, server, or virtualized instance where the data object is prepared for dissemination. This node is interpreted to include standalone applications, web-based publishing clients, and automated headless processes capable of performing local cryptographic operations. The Listening Node or Apparatus refers to any terminal, edge server, mobile device, or localized computing environment capable of receiving and storing data in an inert state. The Aggregation Platform is interpreted as any service, dashboard, or interface that collects, verifies, and displays data from multiple sources for end-user consumption.

Contemporaneous or Synchronized is interpreted as the occurrence of multiple events within a temporal window that is perceptually or computationally simultaneous relative to the application domain. This includes, but is not limited to, high-precision sub-millisecond intervals for financial or industrial applications, as well as broader perceptually simultaneous windows of less than 100 milliseconds for gaming, media releases, or emergency alerts. The term implies that the delta between the first node's transformation and the final node's transformation is minimized to a degree that neutralizes meaningful look-ahead or latency-based advantages.

The Encrypted Payload refers to any electronic data that has been transformed into a ciphered or unreadable format, whether through symmetric or asymmetric encryption, such that it remains inert or unusable until a specific decryption event occurs. An Inert State refers to a data condition where a payload is physically or logically present in a local memory, cache, or storage medium but is mathematically incomplete, cryptographically locked, or otherwise functionally restricted such that it is inaccessible for its intended use, rendering, or secondary dissemination. This state is maintained until the integration of a specific release signal, reconstructed key, or environmental trigger, irrespective of the specific hardware or software architecture used to enforce such restriction. The Unencrypted Version is any plaintext, raw, or usable format of the data prior to encryption or after successful transformation. Transformed Data or Transformed State refers to the resulting data object or stream produced after the decryption key is applied and any optional processing, such as decryption, watermarking, deterministic synthesis, or any programmatic modification that transitions the data from an inert state to a usable state, is completed.

The Verification Hash is defined as a cryptographic fingerprint used to ensure data integrity and is not limited to a single hash but may include a manifest of multiple hashes representing different formats or states of the same data. This is interpreted to include a first verification hash for validating a transformed or unencrypted state and a second verification hash for validating an inert or encrypted state. The Bit-Level Match is the process of comparing the binary structure of the data in a given state against the corresponding verification hash from the manifest to ensure 100% fidelity. This is interpreted to include matches performed against a normalized bitstream, wherein the comparison may ignore non-functional metadata, file-header variations, or padding bits, focusing instead on the essential cryptographic identity of the data at that specific stage of the release cycle. Pre-Commitment is defined as the act of recording a hash or manifest to a persistent record, such as a distributed ledger, at a point in time prior to the delivery of the payload, creating a cryptographic seal of the data's state for both the inert and transformed versions.

The Provenance Registry shall be broadly construed to include any persistent public or private data structure configured to map a digital identity to a public cryptographic key or record, including but not limited to Domain Name System records, Distributed Hash Tables, decentralized identity frameworks, or centralized Certificate Authority directories. The Ledger Oracle refers to any computational entity, smart contract, or distributed consensus mechanism configured to monitor an external state and emit a verifiable signal or pulse to a network, independent of the content originator.

The First Time and Second Time are interpreted as distinct temporal coordinates separated by a duration sufficient for network-wide staging. These times may be defined by absolute timestamps, relative offsets, or the occurrence of a verifiable network pulse or beacon. A Staging Package is a logical container or bundle transmitted at the first time, which may include the encrypted payload, hashes, and metadata. The Decryption Key is any digital value, token, threshold shard, or algorithmically derived witness required to unlock the payload, which may be broadcast as a raw string or reconstructed from multiple sources. Persistent Communication Channels are interpreted to include any low-latency, stateful network connection capable of maintaining a heartbeat to ensure immediate signal propagation.

The Administrative User is defined as any persona, account, or process with high-level system permissions who would typically have the ability to inspect system memory but is cryptographically or hardware-barred from accessing the Secure Processing Environment or the transformed data therein until the second time. The Verifiable Delay Function is interpreted as a computational task that requires a specified, non-parallelizable amount of time to complete, used to normalize the revelation of data across nodes with varying network latencies. Multiparty Metadata refers to any set of attestations, signatures, or records associated with a payload that originates from more than one distinct entity, supporting heterogeneous verification where different parts of the package may be validated against different trust anchors.

The following detailed description is provided to assist in the understanding of the disclosed embodiments. It should be understood that the specific systems, apparatuses, and methods described herein represent exemplary configurations and that various modifications may be made without departing from the scope of the disclosure. Throughout the following sections, the terms "T1" and "T2" are utilized to denote distinct temporal points or windows within a coordinated release cycle, where T1 represents an initial staging period and T2 represents a subsequent, contemporaneous activation event.

Referring to FIG. 1, a block diagram illustrates a high-level system architecture for the synchronized, contemporaneously-enabled release of electronic data. The architecture is designed to decouple the high-bandwidth delivery of data from its cryptographic activation, effectively neutralizing network latency as a competitive factor.

The architecture comprises an Originator Node 100, which serves as the primary source system where electronic data objects are prepared, sealed, and staged for distribution. Within the Originator Node 100, an Issuer Publishing Client 110 provides a localized software environment configured for publishing. To ensure data remains inert during a staging period, a Local Encryption Engine 114 encrypts raw data objects to generate an Encrypted Payload 210 (see FIG. 2). In parallel, Pre-Commitment Logic 118 records a cryptographic fingerprint (e.g., a First Verification Hash 214) to a Public Ledger 150, such as a decentralized blockchain or immutable event log, creating a verifiable "seal" of the data's existence at a specific timestamp.

To establish authenticity, an Identity Signer 122 generates a digital signature anchored to a Provenance Registry 146, which serves as the Authoritative Identity Record. This association allows downstream Listening Nodes 300 to verify the provenance of the Staging Package 200 by validating metadata against the record maintained within the Provenance Registry 146. The Originator Node 100 communicates via a WebSocket Uplink 126, a persistent pipe configured for maintaining a "heartbeat" signal.

Centrally positioned is a Distribution Authority 130, acting as an orchestration system. It includes an Ingestion Buffer 134 for receiving the Staging Package 200. Timing and release are managed by Staging Logic 138 and Key Storage 142. In high-integrity embodiments, the Staging Logic 138 serves as a conditional gatekeeper, evaluating incoming hardware-attested receipts from Listening Nodes 300 against the Hardware Authority Registry 158. This registry comprises a directory of authorized hardware identifiers or public keys corresponding to valid Secure Processing Environments 318 (see FIG. 3). By validating these receipts, the Staging Logic 138 can programmatically compile a distribution whitelist.

The coordinated broadcast of the decryption key at the second time (T2) may be managed by a deterministic scheduler within the Distribution Authority or Originator Node. While this scheduler is configured to automatically trigger the release signal upon the expiration of a countdown defined by the release schedule, the trigger remains subject to a 'Gate-Open' status. This allows the originator to transmit a nullification signal or a rescheduling packet at any point prior to the second time (T2) to update a status registry. If such a signal is received before the countdown reaches zero, the scheduler is programmatically inhibited from broadcasting the key, effectively halting the release or deferring it to a subsequent temporal coordinate without requiring the redistribution of the staging package.

The system further includes a Global State Engine 160, which represents any computational environment or smart contract platform maintaining a shared state. The Global State Engine 160 is communicatively coupled to the Public Ledger 150 to autonomously verify that a T2 release event has been finalized. In non-limiting embodiments, the Global State Engine 160 utilizes the T2 "Key Pulse" as a definitive trigger to transition states (e.g., settling a trade or rendering assets), ensuring the transition occurs in unison across the network only after cryptographic integrity is confirmed.

Prior to a Second Time T2, the Staging Logic 138 ensures the Staging Package 200 is distributed at a First Time T1. During this staging window, Listening Nodes 300 may transmit a receipt back to the Distribution Authority 130, proving possession and integrity of the inert payload. In certain configurations, the Distribution Authority 130 utilizes these receipts to execute a Key Encapsulation Mechanism (KEM), wrapping the decryption key specifically for the compliant nodes. At T2, the Staging Logic 138 and/or the Ledger Oracle 154 triggers the release of the key, facilitating contemporaneous access. By utilizing this architecture, the system can saturate the network with "heavy" data during a staging window, needing only to broadcast a "light," targeted signal at T2 to trigger global activation and a synchronized state change within the Global State Engine 160.

Figure 2:
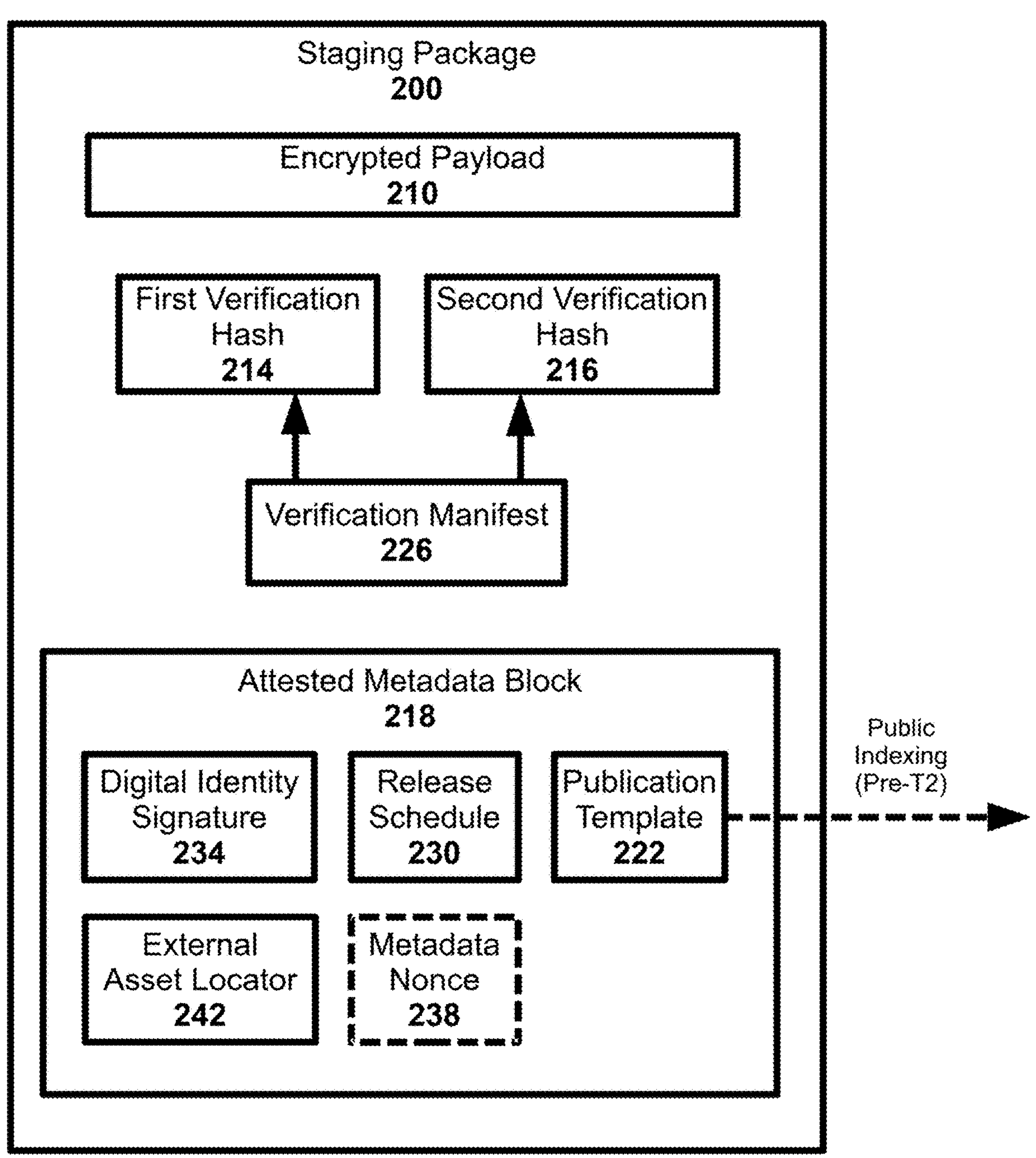
FIG. 2 is a schematic block diagram illustrating the logical components of a staging package, including an encrypted payload and associated metadata, in accordance with the present disclosure.

Referring to FIG. 2, a schematic block diagram illustrates the logical components of a Staging Package 200, configured as a multipart digital container for secure dissemination. The Staging Package 200 acts as the primary vehicle for transporting data in an inert state from an Originator Node 100 (see FIG. 1) to a plurality of Listening Nodes 300 (see FIG. 3).

The Staging Package 200 includes an Encrypted Payload 210, which comprises the core data object after it has been processed by a Local Encryption Engine 114. The Encrypted Payload 210 is cryptographically locked, rendering it unreadable until a corresponding decryption key is applied at T2. To ensure bit-level fidelity, the package includes a First Verification Hash 214, derived from an unencrypted version of the data, which serves as the unique cryptographic identifier cross-referenced by the Public Ledger 150.

Crucially, to support pre-release verification, the Staging Package 200 includes a Second Verification Hash 216, derived from the Encrypted Payload 210 in its inert state. This allows for a bit-level match against the ciphertext itself prior to the second time T2. Furthermore, a Verification Manifest 226 is provided for mapping a unique mathematical relationship between the root hashes (214, 216) and a plurality of secondary hashes representing different file formats or fragments of the data object.

For identity management and governance, an Attested Metadata Block 218 is provided as a verifiable header. This block includes a Digital Identity Signature 234 for provenance and a Release Schedule 230 defining the exact temporal coordinates for the transition from T1 to T2. To facilitate high-integrity "proof of staging" requirements, the Attested Metadata Block 218 is configured to include a Metadata Nonce 238. In certain embodiments, this nonce functions as a Challenge-Response Nonce that the Listening Node 300 must sign or incorporate into its outbound hardware-attested receipt. This ensures that the proof of staging is temporally unique and bound to a specific release instance, preventing the reuse of stale attestations and providing a cryptographic "heartbeat" of compliance.

Additionally, the Attested Metadata Block 218 includes an External Asset Locator 242, comprising a URI pointing to unencrypted "drip" content, allowing for readable context while the primary payload remains staged. A Publication Template 222 is further utilized to auto-populate teaser summaries for public indexing. In configurations requiring individual node gating, the Attested Metadata Block 218 may contain specific instructions or public key requirements for the Key Encapsulation Mechanism (KEM) used by the Distribution Authority 130. By housing these elements within the Attested Metadata Block 218, the system ensures that the Listening Node 300 has all necessary parameters to validate the payload, generate its proof of staging, and prepare its Secure Processing Environment 318 for the T2 transformation.

Figure 3:
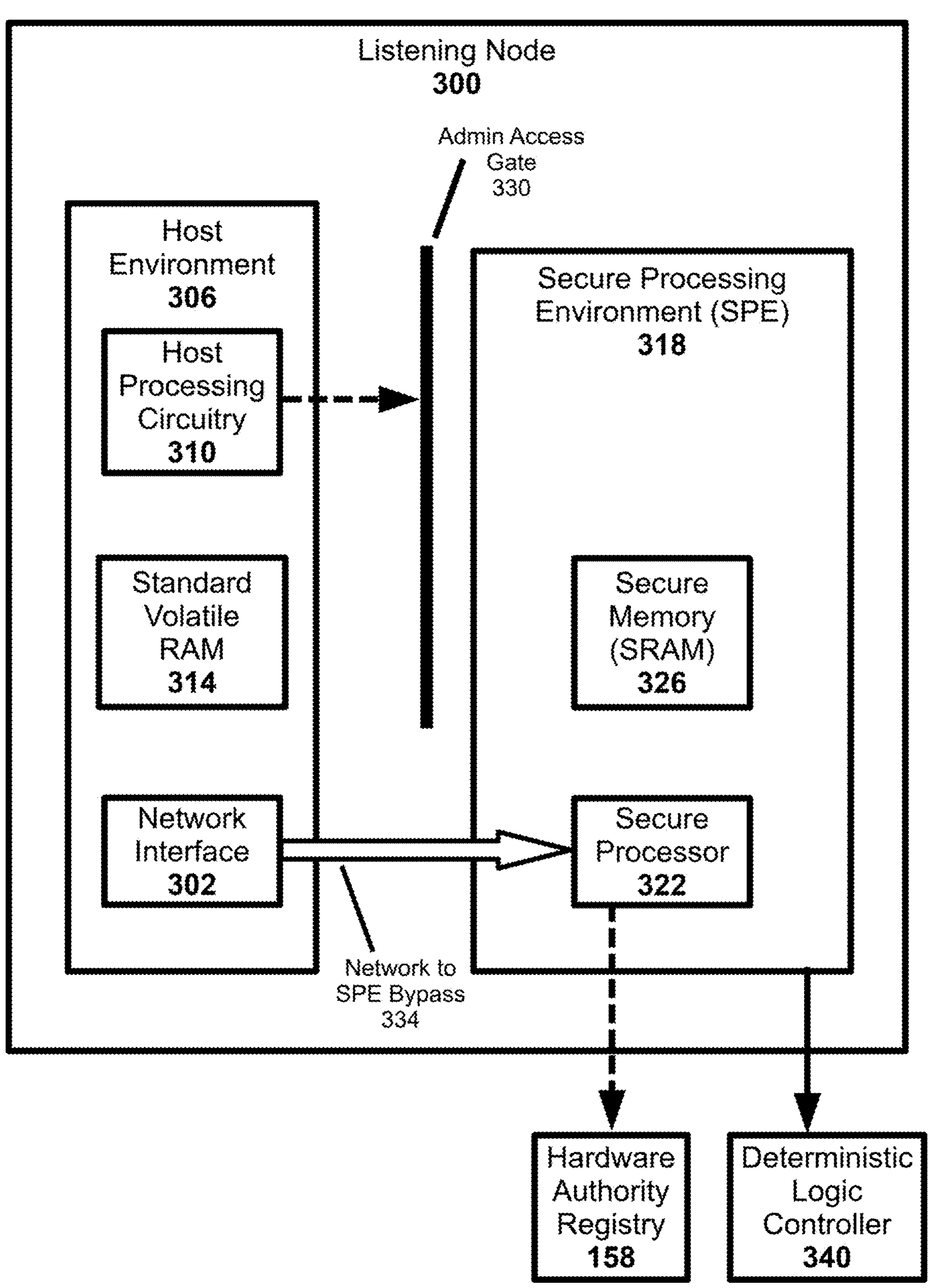
FIG. 3 is a hardware block diagram illustrating a listening node apparatus featuring a hardware-isolated secure processing environment (SPE), a network-to-SPE bypass, and a deterministic logic controller, in accordance with the present disclosure.

Referring to FIG. 3, a hardware block diagram illustrates a Listening Node 300 apparatus featuring a Host Environment 306 and a Secure Processing Environment (SPE) 318, bridged by a dedicated Network-to-SPE Bypass 334. The Listening Node 300 acts as the decentralized edge-point where the transition from an inert to a readable state occurs contemporaneously across the network via a "Key Pulse" event.

The Listening Node 300 receives external data, identity records, and release signals via a Network Interface 302. The Host Environment 306 comprises Host Processing Circuitry 310 and Standard Volatile RAM 314. The Host Processing Circuitry 310 is configured for managing general-purpose, non-secure operating system tasks, such as network stack handling, interface rendering, and performing external lookups to the Provenance Registry 146 (see FIG. 1). In a practical implementation, these lookups involve querying a DNS TXT record to retrieve cryptographic material required to verify the Digital Identity Signature 234 (see FIG. 2). The Standard Volatile RAM 314 serves as the primary ingress buffer for holding the Staging Package 200 in its encrypted state.

Critically, the Listening Node 300 includes a Secure Processing Environment (SPE) 318, implemented as a secure enclave physically or logically partitioned from the Host Environment 306 (e.g., via a Hardware-Isolated TEE, ARM TrustZone, Intel SGX, RISC-V MultiZone, or a dedicated security co-processor). Inside the SPE 318, a Secure Processor 322 and Secure Memory (SRAM) 326 are situated. To facilitate the discovery layer, the Secure Processor 322 is configured to retrieve a node-specific private key corresponding to a public record maintained in the Hardware Authority Registry 158 (see FIG. 1). The Secure Processor 322 executes the transformation logic, while the Secure Memory 326 provides an isolated range for storing the transformed data and the decryption key in a state shielded from the host.

In one perspective, the Secure Processor 322 is further configured to execute an outbound attestation routine. Upon successful bit-level verification of the Encrypted Payload 210, the Secure Processor 322 generates a Hardware-Attested Receipt utilizing a unique device key stored within Secure Memory 326. This receipt is passed through the Network-to-SPE Bypass 334 for external broadcast, providing cryptographic evidence of staging compliance without exposing the internal state of the Secure Processing Environment 318.

To facilitate near-instantaneous activation, a Network-to-SPE Bypass 334 is provided. As illustrated, the Network-to-SPE Bypass 334 is a one-way data pipe configured as a high-priority hardware interrupt, a dedicated bus, or a direct memory access (DMA) path. This path is configured for routing the arrival of a decryption key or release signal directly from the Network Interface 302—sourced from either the Distribution Authority 130 or the Ledger Oracle 154 (see FIG. 1)—to the Secure Processor 322. By bypassing the standard processing queues and interrupt latency of the Host Processing Circuitry 310, the Network-to-SPE Bypass 334 ensures that the "Key Pulse" is processed with minimal jitter for contemporaneous global activation.

Access to the secure environment is governed by an Admin Access Gate 330. The Admin Access Gate 330 is positioned at the hardware or logical boundary of the SPE 318 and is configured for intercepting and blocking any high-privilege or "root" level attempts by the Host Processing Circuitry 310 to access the internal components of the enclave. By enforcing this hardware-level barrier, the Admin Access Gate 330 ensures that the data remains inert and inaccessible to the recipient until the cryptographic conditions of the Release Schedule 230, the bit-level match of the Second Verification Hash 216, and the final validation of the First Verification Hash 214 are satisfied within the environment.

Further illustrated is a Deterministic Logic Controller 340, which is communicatively coupled directly to the SPE 318. This connection provides a bridge to external hardware, actuators, or industrial control systems, allowing the SPE 318 to trigger a specific logic state or physical action upon the successful transformation of the data at T2. By routing the output signal directly from the Secure Processor 322 to the Deterministic Logic Controller 340, the system ensures that high-stakes actions—such as industrial load shedding or synchronized rendering events—are executed in perfect unison across a plurality of nodes. This direct interconnection bypasses the non-deterministic processing delays of the Host Environment 306, enabling the Listening Node 300 to function as a precisely timed actuator within a larger, synchronized logical organism.

Figure 4:
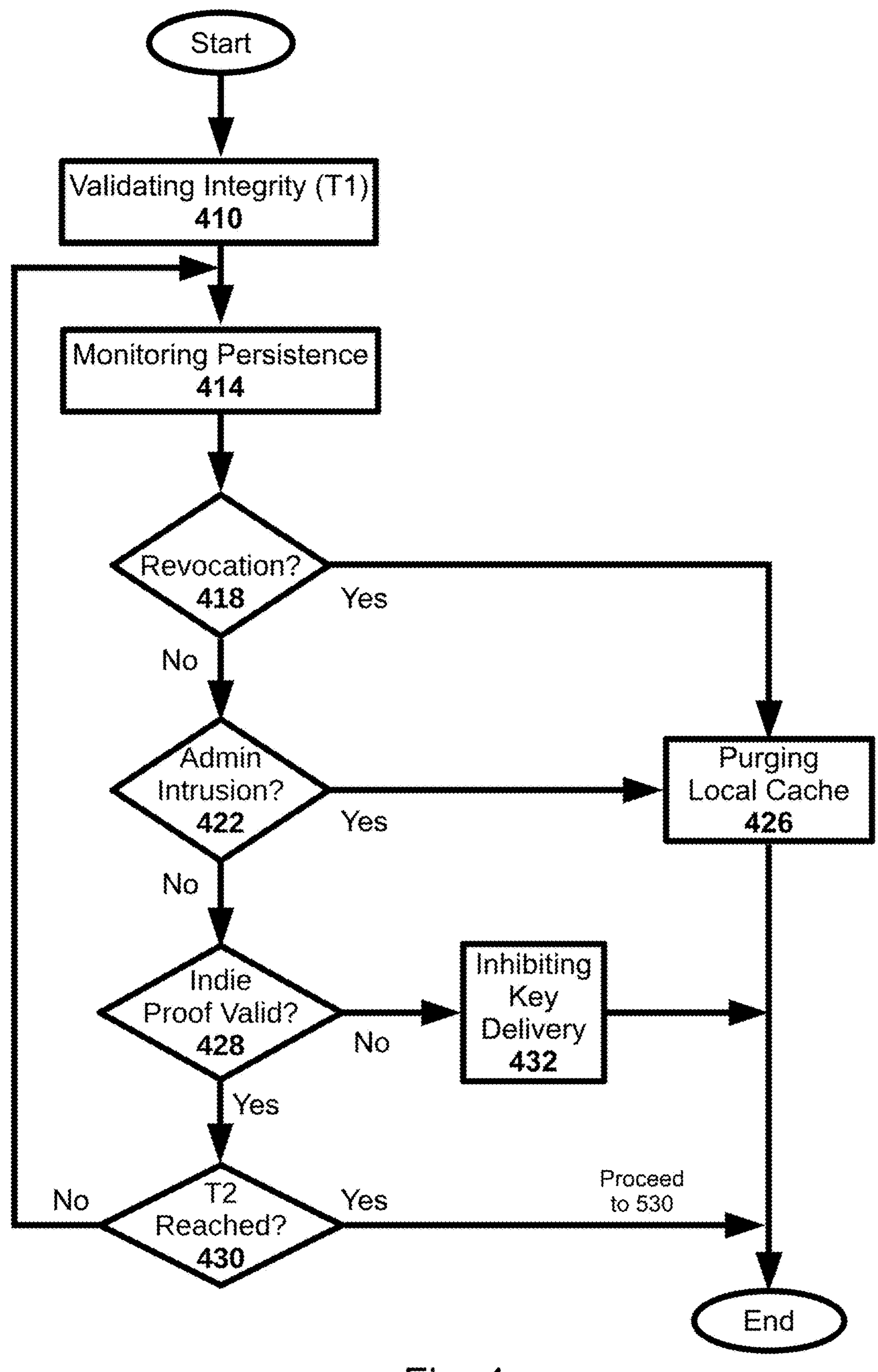
FIG. 4 is a flowchart illustrating the operational logic for staging data in an inert state and managing administrative access, in accordance with the present disclosure.

Referring to FIG. 4, a flowchart illustrates an Inert Staging Flow 400 for managing the local retention and security of data prior to activation. While the following steps are described in a preferred sequence to facilitate the Listening Node 300 (see FIG. 3) operating as a hardware-isolated "black box," the architecture remains flexible to alternative orderings or the omission of specific checks based on the trust environment.

The flow begins at time T1 at step 410 with Validating Integrity. This step involves the Secure Processor 322 performing a bit-level match of the Encrypted Payload 210 against the Second Verification Hash 216. This confirms the ciphertext is uncorrupted and identical to the version sealed by the Originator Node 100, while a simultaneous provenance check verifies the Digital Identity Signature 234. Once validated, the node commences at step 414, Monitoring Persistence, a process for detecting unauthorized attempts to modify encrypted data while it resides in Standard Volatile RAM 314.

In synchronicity with these integrity checks, the node, at step 418, is Listening for Revocation. This step involves scanning the WebSocket Uplink 126 or the Public Ledger 150 for a "kill signal" indicating the broadcast has been cancelled. If a revocation is detected before T2, the flow moves at step 426 to Purging Local Cache to remove the inert payload. A critical hardware security check is performed at Decision 422, Detecting Admin Intrusion?, where the Admin Access Gate 330 evaluates whether a high-privilege process has attempted to bypass the SPE boundary. If an intrusion is detected, the node proceeds at step 426 to Purging Local Cache, ensuring data is never exposed to a compromised environment.

In embodiments requiring high-integrity market participation, the flow proceeds to Decision 428, Individual Proof Validated?. This logic evaluates whether the node's Hardware-Attested Receipt was successfully recorded during a defined staging window (e.g., between T1 and a pre-determined cut-off time). If the proof is missing or received outside the permissible window, the flow moves at step 432 to Inhibiting Key Delivery. In this state, the node is programmatically excluded from the targeted key distribution set, effectively neutralizing race conditions and ensuring that only compliant nodes can participate in the data transformation.

If the individual proof is validated, or in embodiments where such validation is bypassed, the flow proceeds to Decision 430, Reaching Release Time T2?. This decision evaluates whether the synchronized system clock or a decentralized event from the Ledger Oracle 154 matches the Release Schedule 230. The node remains in an inert staging loop until the release conditions are satisfied. Upon satisfaction of the trigger, the Network-to-SPE Bypass 334 facilitates the instantaneous delivery of the decryption key to the Secure Processor 322 for data transformation.

Figure 5:
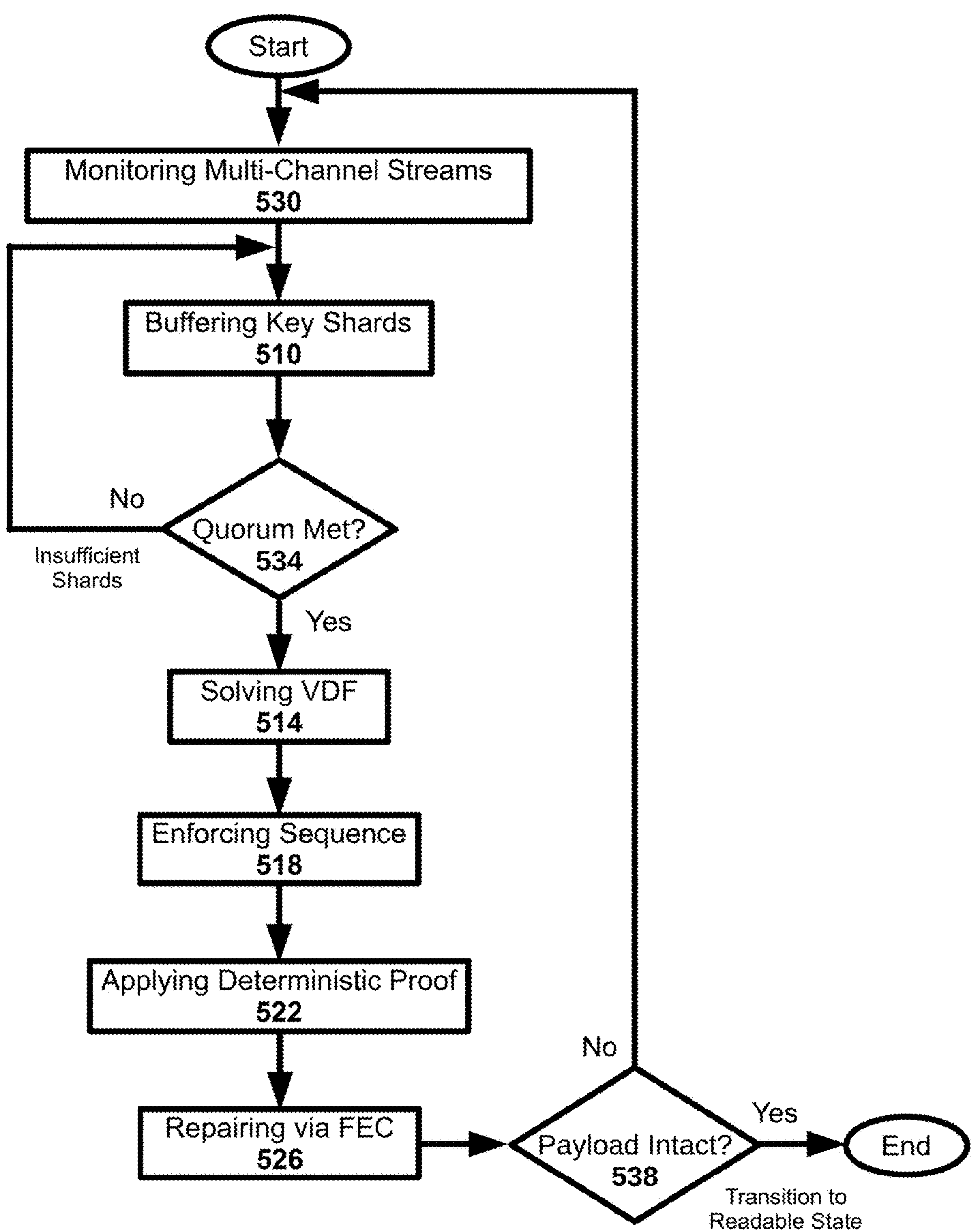
FIG. 5 is a flowchart illustrating a procedural method for temporal normalization via a verifiable delay function (VDF) upon receipt of a decryption key, in accordance with the present disclosure.

Referring to FIG. 5, a flowchart illustrates a Normalization Flow 500 for achieving contemporaneous data activation via a verifiable delay function (VDF) or similar sequential proof. This procedural method is configured for neutralizing the inherent advantages of nodes with superior physical proximity to a Distribution Authority 130 (see FIG. 1) or those with low-latency access to the Public Ledger 150.

The flow begins at step 530 with a Multi-Channel Listener, a step for monitoring redundant communication streams to capture the first-to-arrive instance of a decryption key, key fragment, or release pulse. This includes monitoring the Network-to-SPE Bypass 334 for signals originating from the Distribution Authority 130, the WebSocket Uplink 126, or the Ledger Oracle 154. Following the detection of a signal, the node proceeds, at step 510, to Buffering Key Shards for storing incoming cryptographic fragments from multiparty or distributed sources.

At Decision 534, Quorum Met?, the logic asks whether a sufficient threshold of shards or a valid signed message from a consensus group has been collected to reconstruct a functional decryption key. If "Yes," the flow proceeds, at step 514, to Solving VDF. This step involves executing a computationally sequential mathematical operation that cannot be parallelized. By way of practical example, this may include repeated squaring in a group of unknown order or recursive hashing (e.g., Sloth or MiMC). By Enforcing Sequence at step 518, the Secure Processor 322 ensures a mandatory, verifiable duration of time passes before the key becomes usable. This artificial delay is calibrated to exceed the maximum possible network jitter or block-time variance, thereby normalizing the release time across all nodes regardless of their geographic location.

Once the delay duration is satisfied, the node proceeds, at step 522, to Applying Deterministic Proof, using the VDF output as a cryptographic salt, secondary key-encryption-key (KEK), or secondary input. This ensures that the decryption process within the SPE 318 cannot mathematically commence until the sequential proof is completed. Following decryption, the node executes, at step 526, Repairing via FEC, utilizing forward error correction to heal any payload bits that may have been corrupted during the T1 staging window. For instance, a Reed-Solomon or Low-Density Parity-Check (LDPC) algorithm may be applied to reconstruct missing or malformed data packets without requiring a re-transmission from the source.

The process concludes at Decision 538, Payload Intact?, which asks whether the reconstructed data matches the First Verification Hash 214 (see FIG. 2) as confirmed by the Public Ledger 150. If the answer is "Yes," the data is transitioned to a readable state within the SPE 318. This multi-stage verification ensures that the transition from inert to readable is both bit-perfect and globally contemporaneous.

Figure 6:
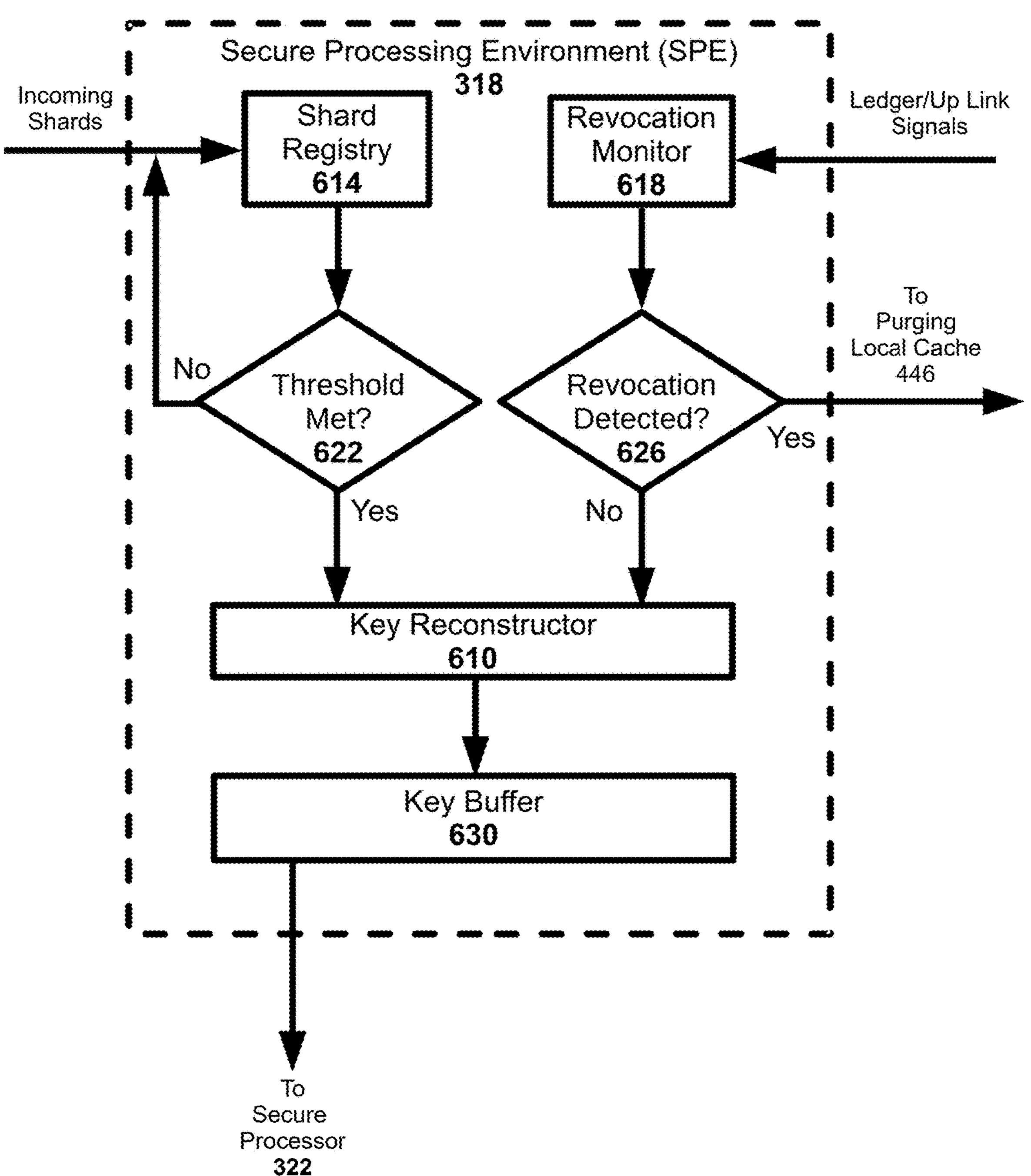
FIG. 6 is a functional block diagram illustrating the logic for multiparty key reconstruction and the integration of a revocation monitor, in accordance with the present disclosure.

Referring to FIG. 6, a functional block diagram illustrates a Multiparty Logic 600 for threshold key reconstruction and the integration of a revocation signal. This functional architecture ensures that no single entity—including the Distribution Authority 130—has the power to release the data prematurely and that an Originator Node 100 (see FIG. 1) retains the ability to cancel a release up until the moment of activation.

The process is managed by a Key Reconstructor 610, which is configured for reassembling cryptographic shards—utilizing a scheme such as Shamir's Secret Sharing or a similar threshold-based cryptographic protocol—into a functional decryption key. Before reconstruction begins, a Shard Registry 614 is utilized for validating each incoming shard. This validation ensures that shards are not only mathematically compatible but also authentic. For example, the Shard Registry 614 may cross-reference shard signatures against the Provenance Registry 146 to confirm they originated from authorized participants or hardware-verified signers.

The logic operates under the Decision 622, Threshold Met?, which asks whether a sufficient plurality of shards (e.g., an m-of-n quorum) has been successfully validated by the Shard Registry 614. If the answer is "Yes," the flow proceeds to a secondary check at Decision 626, Revocation Detected?. This secondary check is informed by a Revocation Monitor 618, which is configured for scanning multiple redundant streams, including the WebSocket Uplink 126 and the Public Ledger 150, for a specific "kill signal" or a "revocation transaction" associated with the First Verification Hash 214 of a Staging Package 200.

The Decision 626, Revocation Detected? asks whether a valid revocation signal has been broadcast by the Originator Node 100. If the answer is "Yes," the reconstruction process is aborted, and the node proceeds to Purging Local Cache 426 (see FIG. 4). This ensures that even if a quorum of shards is physically present, the hardware will not assemble them if an immutable "stop" command exists on the ledger or the uplink.

If no revocation is detected, the Key Reconstructor 610 finalizes the assembly of the key and stores it temporarily in a Key Buffer 630. The Key Buffer 630 is situated within the SPE 318 (see FIG. 3) and is configured for holding the reconstructed key in a ready state for immediate handoff to the Secure Processor 322 at time T2. By integrating the revocation check directly into the reconstruction logic, the system ensures that kill signals are honored with high finality, supporting contemporaneous activation across the network even if a quorum for release has already been achieved.

Figure 7:
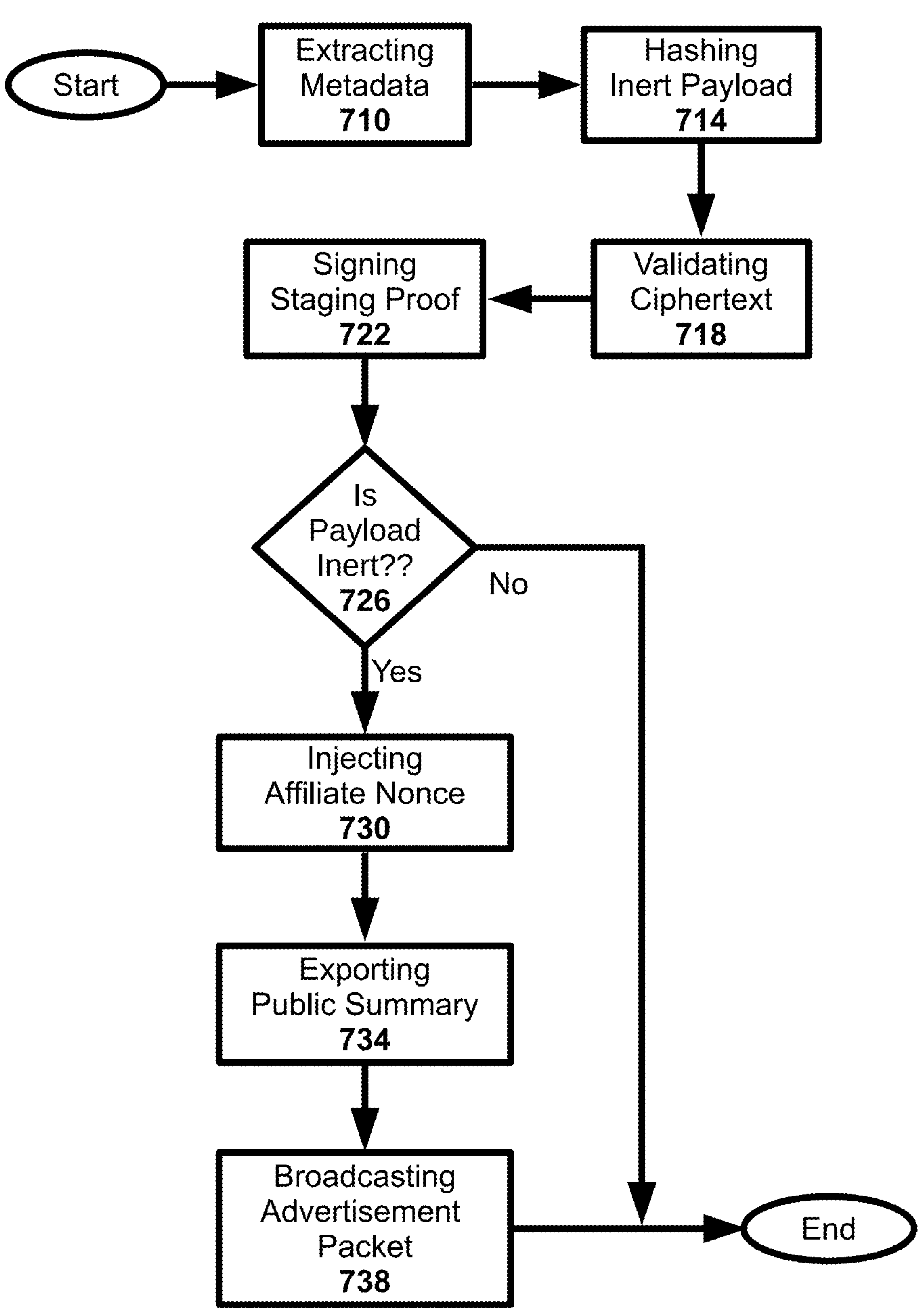
FIG. 7 is a flowchart illustrating the operational flow of an aggregation platform, including source identity validation and bit-level verification, in accordance with the present disclosure.

Referring to FIG. 7, a flowchart illustrates an Aggregation Flow 700 for the generation of a hardware-attested discovery record while the encrypted payload remains in an inert state. This procedural logic enables the system to establish a verifiable possession record for the data during a T1 staging window without exposing the Encrypted Payload 210 or requiring the decryption key.

The flow initiates at step 710 with Extracting Metadata, a process for isolating the Attested Metadata Block 218 from the multipart Staging Package 200. By separating this block, the Main CPU 310 (see FIG. 3) can access non-sensitive identity records and teaser data without interacting with the cryptographically locked portions of the container.

To facilitate the verification of the staged content prior to release, the Secure Processing Environment 318 (see FIG. 3) performs Hashing Inert Payload at step 714. In this step, the Secure Processor 322 generates a local cryptographic fingerprint derived from the bit-level structure of the Encrypted Payload 210 while it remains in an encrypted, inert state. This is followed by Validating Ciphertext at step 718, where the locally generated fingerprint is compared against the Second Verification Hash 216 received within the staging package.

Upon a successful match—indicating that the bit-level integrity of the ciphertext is confirmed—the flow proceeds to Signing Staging Proof at step 722. During this step, the Secure Processor 322 utilizes a node-specific private key to digitally sign a bundle comprising the Second Verification Hash 216 and a hardware-enforced timestamp. This generates a hardware-attested proof of possession that is cryptographically tied to the physical hardware of the Listening Node 300 and is verifiable against the Hardware Authority Registry 158 (see FIG. 1).

A validation check is performed at Decision 726, Is Payload Inert?. This decision confirms, via the Public Ledger 150, that the Encrypted Payload 210 remains in its cryptographically sealed state and that the Release Schedule 230 has not yet reached the second time T2. This ensures a strict temporal firewall between the public-facing advertisement logic and the post-T2 transformation process.

If the payload is confirmed as inert, the system performs Injecting Affiliate Nonce at step 730. In this step, the Secure Processor 322 retrieves the subscriber-specific Metadata Nonce 238 and embeds it into the machine-readable summary to provide immutable mathematical attribution for the node's role in the staging topology. The flow then proceeds to Exporting Public Summary at step 734, where the extracted teaser data and the hardware-attested proof are formatted into an indexable record.

Finally, the flow concludes with Broadcasting Advertisement Packet at step 738. This step involves the transmission of a discrete digital bundle—comprising the machine-readable summary, the hardware-attested proof of possession, and the affiliate nonce—to an external discovery interface, such as a distributed aggregation platform or a public registry. This enables the universal indexing of the data's availability and provenance without requiring the release of the decryption key or the unencrypted content.

Figure 8:
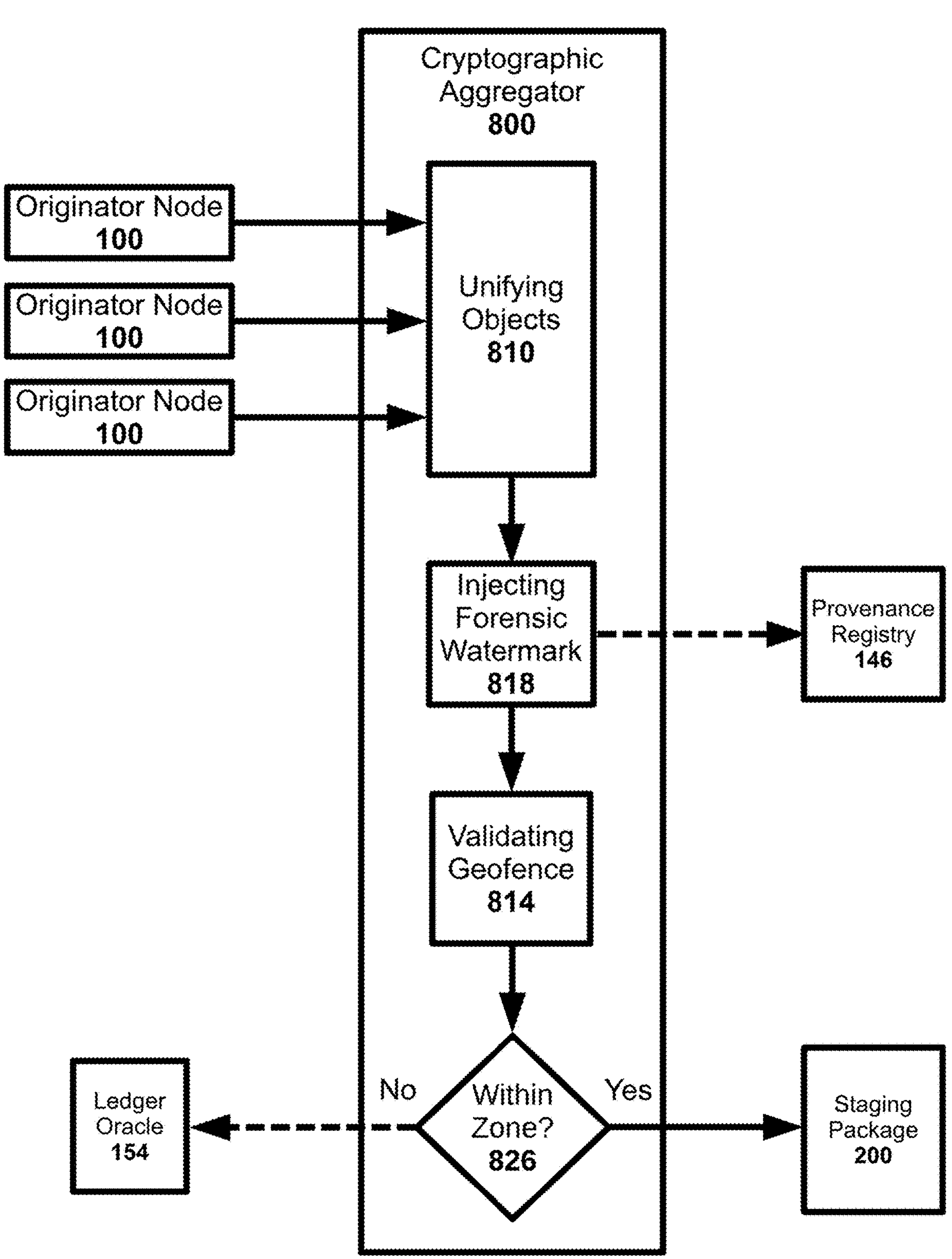
FIG. 8 is a functional block diagram illustrating a cryptographic aggregator configured to inject forensic metadata and subscriber-specific nonces into a unified staging package, in accordance with the present disclosure.

Referring to FIG. 8, a functional block diagram illustrates a Cryptographic Aggregator 800 configured to inject forensic metadata into a unified staging package. This apparatus serves as a high-throughput junction for multiplexing streams 822 from a plurality of Originator Nodes 100 (see FIG. 1), allowing the network to manage multiple, independent data releases within a synchronized framework.

The Cryptographic Aggregator 800 executes unifying objects 810, a step for merging disparate encrypted payloads and their associated metadata into a single, cohesive Staging Package 200 (see FIG. 2). This unification process ensures that a Listening Node 300 (see FIG. 3) can receive and stage multiple data sets via a single high-bandwidth burst, reducing the overhead required for managing individual release schedules.

During the unification process, the system performs injecting forensic watermark 818. This step involves embedding unique identifiers or cryptographic tags into the metadata of the unified package. These watermarks are optionally cross-linked to the Provenance Registry 146 to provide a non-repudiable forensic trail. This trail can be used to identify the specific path or node responsible for the data in the event of a security audit or unauthorized leak post-decryption.

The Cryptographic Aggregator 800 further implements specialized location-based security via validating geofence 814. This step involves checking the forensic metadata against the hardware-reported logical or physical coordinates of the recipient nodes. The logic operates under the decision Within Authorized Zone? 826, which asks whether the location of a Listening Node 300 matches the spatial constraints defined in the Release Schedule 230 (see FIG. 2).

If the answer is "No," the Cryptographic Aggregator 800 is configured to withhold the decryption key or notify the Ledger Oracle 154 (see FIG. 1) to suppress the "Key Pulse" for that specific node, ensuring that the data remains inert if moved outside of a permitted jurisdiction. If the answer is "Yes," the unified package is fully staged and prepared for the temporal activation sequence. This integration of forensic and spatial data ensures that the contemporaneous release is not only synchronized via the Public Ledger 150 in time but also strictly controlled in physical or logical space.

Figure 9:
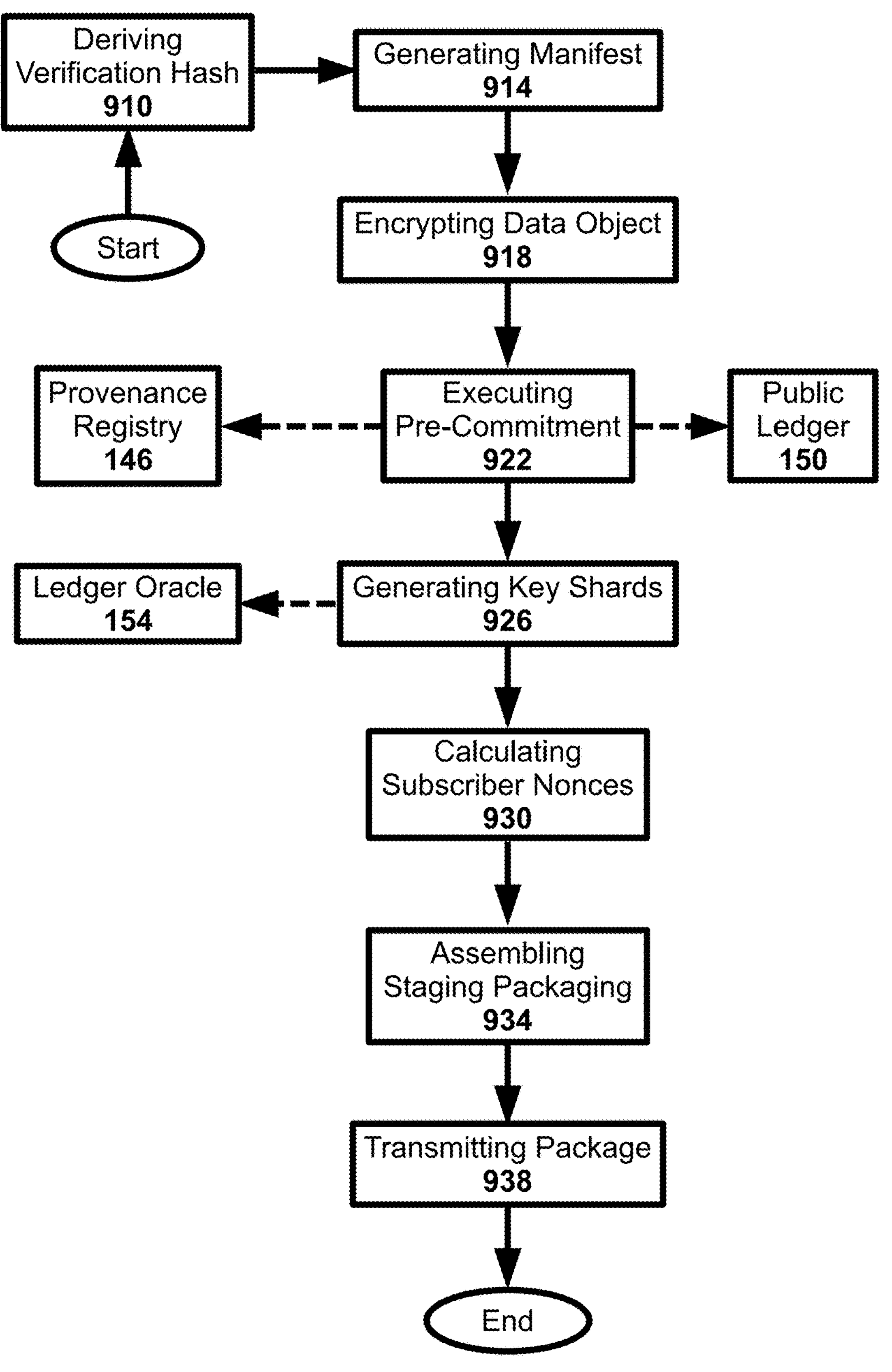
FIG. 9 is a flowchart illustrating a computer-implemented method for the secure preparation of a synchronized data release at an originator node, including local encryption and hash pre-commitment, in accordance with the present disclosure.

Referring to FIG. 9, a flowchart illustrates an Originator Preparation Flow 900 for the secure preparation of a contemporaneous data release. This flow provides the procedural enablement for generating a "sealed" package that remains inert until a threshold temporal coordinate is reached.

The flow begins at step 910 with Deriving Verification Hash, where a binary fingerprint is generated from the raw data object. To support multi-format releases and multi-stage validation, the flow proceeds at step 914 to Generating Manifest, a step for defining a unique mathematical relationship between a plurality of verification hashes. This manifest includes hashes for both the inert, encrypted state and the transformed, usable state across different file formats, ensuring the recipient can verify integrity at both T1 and T2.

The node then performs, at step 918, Encrypting Data Object, using a cryptographic key to generate the encrypted payload. To ensure the originator is bound to the content, the flow moves at step 922 to Executing Pre-Commitment, where the verification manifest and a timestamp are recorded on the Public Ledger 150. This ledger entry provides verifiable proof of the data's entropy and existence prior to any network distribution. Contemporaneously, the originator's identity is anchored via the Provenance Registry 146—for example, by ensuring a public key corresponding to the Identity Signer 122 is discoverable in a public record.

To prevent premature release by any single entity, the flow continues at step 926 with Generating Key Shards. In this step, the decryption key is split into a plurality of independent shards distributed to distinct entities or stored within the Ledger Oracle 154 infrastructure. This ensures the key is only reconstructible upon a threshold release at T2. Furthermore, the flow executes, at step 930, Calculating Subscriber Nonces to generate node-specific metadata nonces. These nonces are configured for deterministic synthesis with the decryption key at the edge, ensuring that each Listening Node 300 generates a uniquely watermarked version of the transformed data.

The finalized components are merged at step 934 during Assembling Staging Package, which combines the encrypted payload, the verification manifest, the release schedule, and the subscriber nonces into a unified container. The flow concludes at step 938 with Transmitting Package, where the staging package is pushed to the network for arrival at a plurality of listening nodes at T1. This ensures the data is staged and verified well in advance of the decryption key pulse triggered by the Distribution Authority 130 or the Ledger Oracle 154.

The following description illustrates the versatility of the T1/T2 architecture across diverse application domains. While the embodiments frequently reference financial disclosures, the architecture is equally applicable to massive online gaming environments where fairness relies on the contemporaneous rendering of assets. In such cases, the encrypted payload may comprise 3D geometry or texture maps, and the release signal ensures that no player gains a look-ahead advantage due to server proximity. Furthermore, in Internet of Things (IoT) and Industrial Control Systems (ICS), the architecture treats a distributed network of edge actuators as a single, synchronized logical organism. By staging commands in an inert state, a central controller can ensure that high-stakes actions, such as 'Synchronized Load Shedding' or 'Coordinated Grid Response,' are processed in perfect unison, neutralizing network propagation delays.

The architecture also provides a defense against front-running and miner extractable value (MEV) attacks in decentralized networks. By using the staging package to commit to data off-chain while utilizing the decryption key release to settle the transaction on-chain, the system prevents participants from exploiting latency for financial gain. The present disclosure further facilitates high-integrity prediction markets and price discovery mechanisms by creating a verifiable "Staging Window" between T1 and T2. This allows the Global State Engine 160 to manage market positions against a sealed but unrevealed truth, ensuring that the transition to a known state is immune to information asymmetry, as the data's entropy is locked via the Pre-Commitment 118 before any participant—including the market orchestrator—can gain access to the transformed content.

This security posture is strengthened by the cryptographic binding of release signals to verified source identities via a persistent provenance registry. By anchoring digital signatures to public records (e.g., DNS TXT records or Distributed Ledgers), Listening Nodes 300 can autonomously authenticate the origin of a decryption key at the network edge. In certain embodiments, the Secure Processing Environment 318 is configured to query this registry as a mandatory prerequisite for decryption, programmatically inhibiting the transition to a readable state if the identity verification fails. This ensures the release pulse is cryptographically tethered to a verified authority, mitigating the risk of signal spoofing or unauthorized key injection.

Furthermore, the integration of these identity anchors with the Public Ledger 150 and Ledger Oracle 154 ensures a multi-factor gatekeeping environment. The data remains inert unless the release signal perfectly aligns with the pre-committed records of the authoritative source, providing a layer of accountability across diverse trust environments, ranging from decentralized public ledgers to centralized certificate authorities. The systems and methods described herein are further configured for high-concurrency scalability and data resilience, utilizing probabilistic uniqueness filters to manage massive volumes of staging packages and forward error correction (FEC) to programmatically repair transmission errors. These mechanisms ensure that the contemporaneous release is achieved with bit-level integrity across diverse and potentially lossy communication environments, including satellite, mesh, and peer-to-peer networks.

Although the disclosure has been shown and described with respect to a certain preferred aspect or aspects, it is obvious that equivalent alterations and modifications will occur to others skilled in the art upon the reading and understanding of this specification and the annexed drawings. In particular regard to the various functions performed by the above-described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the disclosure. In addition, while a particular feature of the disclosure may have been described above with respect to only one of several illustrated aspects, such feature may be combined with one or more other features of the other aspects, as may be desired and advantageous for any given or particular application.

The description herein with reference to the figures will be understood to describe the present disclosure in sufficient detail to enable one skilled in the art to utilize the present disclosure in a variety of applications and devices. It will be readily apparent that various changes and modifications could be made therein without departing from the spirit and scope of the disclosure as defined in the following claims.

I claim:

1. A system for synchronized release of electronic data, comprising:

a memory storing an encrypted payload and a verification hash derived from an unencrypted version of the encrypted payload;

a processor in communication with the memory and a network interface, the processor configured to:

distribute, at a first time, a staging package to a plurality of listening nodes, the staging package comprising the encrypted payload and the verification hash;

receive a cryptographically signed receipt from one or more listening nodes of the plurality of listening nodes, the cryptographically signed receipt providing cryptographic evidence of confirmed possession of the staging package prior to a second time; and broadcast, at the second time, a decryption key to the plurality of listening nodes, the second time subsequent to the first time;

wherein the decryption key enables the plurality of listening nodes to locally perform a transformation of the encrypted payload into transformed data and verify an integrity of the transformed data via a bit-level match against the verification hash.

2. The system of claim 1, wherein the staging package further comprises an attested metadata block including an authoritative identity record, and wherein the transformation of the encrypted payload is further conditioned upon successful verification of the authoritative identity record against a persistent public record.

3. The system of claim 1, wherein the processor is further configured to broadcast a revocation signal prior to the second time, wherein the revocation signal is configured to programmatically inhibit the transformation of the encrypted payload by an update to a status registry required for key activation.

4. The system of claim 1, wherein at least one of the plurality of listening nodes are configured to execute a verifiable delay function (VDF) upon receipt of the decryption key, the VDF configured to define a sequential computational duration required to reveal the transformed data, to normalize revelation timing across the plurality of listening nodes regardless of network latency.

5. The system of claim 1, wherein the second time is defined by a verifiable time-stamped pulse from a distributed beacon, and the plurality of listening nodes are configured to execute the local transformation within a millisecond-range window of said pulse.

6. The system of claim 1, wherein the local transformation and the integrity verification are performed as an atomic operation, such that the transformed data is deleted from volatile memory if the bit-level match against the verification hash fails.

7. The system of claim 1, wherein the one or more listening nodes of the plurality of listening nodes are configured to transmit a cryptographically signed receipt of the staging package prior to the second time as a prerequisite for receipt of the decryption key at the second time.

8. A listening node apparatus for synchronized transformation of electronic data, comprising:

a network interface configured to receive a staging package at or after a first time and a decryption key at a second time;

a secure processing environment comprising a secure processor and a secure memory, the secure processing environment configured to:

generate and transmit, via the network interface, a cryptographically signed receipt that provides cryptographic evidence of confirmed possession of the staging package prior to the second time, the second time subsequent to the first time;

stage an encrypted payload from the staging package in an inert state;

transform the encrypted payload into transformed data using the decryption key; and render the transformed data only upon a successful bit-level match against a verification hash received at or after the first time.

9. The apparatus of claim 8, wherein the secure processing environment is further configured to execute a verifiable delay function (VDF) to enforce a sequential computational duration, to render the transformed data at a precise temporal offset from the second time.

10. The apparatus of claim 8, wherein the secure processing environment is configured to utilize a subscriber-specific metadata nonce to generate a uniquely watermarked version of the transformed data.

11. The apparatus of claim 8, wherein the decryption key is a multiparty threshold key reconstructed from a plurality of independent shards, and wherein the secure processing environment is configured to utilize a probabilistic uniqueness filter to verify the plurality of independent shards against a registry of active release events.

12. The apparatus of claim 8, wherein the listening node is configured to generate a hardware-attested proof of staging only upon a successful bit-level match of the encrypted payload against a second verification hash derived from the encrypted payload in the inert state.

13. A computer-implemented method for synchronized release of electronic data, the method comprising:

receiving, at a listening node, an encrypted payload, a verification hash, and a release schedule at or after a first time;

generating and transmitting, via a network interface, a cryptographically signed receipt providing cryptographic evidence of confirmed possession of the encrypted payload prior to a second time, the second time subsequent to the first time;

staging the encrypted payload in local memory in an inert state according to the release schedule;

receiving a release signal comprising a decryption key at a second time defined by the release schedule; and transitioning the encrypted payload from the inert state to a transformed state at the listening node in response to the release signal, wherein the transitioning is performed locally without further retrieval from a distribution server, and wherein the transformed state is verified via a bit-level match against the verification hash received at or after the first time.

14. The method of claim 13, wherein the local memory is a hardware-secured edge-node cache configured to purge the encrypted payload if the transition to the transformed state fails a bit-level integrity check.

15. The method of claim 13, wherein the listening node verifies the release schedule and the release signal against a notarized record on a distributed ledger.

16. The method of claim 13, further comprising verifying the decryption key against a pre-committed cryptographic witness received at the first time, the pre-committed cryptographic witness providing a verifiable proof that the decryption key corresponds to the encrypted payload.

17. A computer-implemented method for secure preparation of a synchronized data release, the method comprising:

- generating, at an originator node, a verification hash derived from an unencrypted version of a data object;
- encrypting the data object using a cryptographic key corresponding to a decryption key to generate an encrypted payload;
- preparing a release signal comprising the decryption key;
- assembling a staging package comprising the encrypted payload, the verification hash, and a release schedule;
- transmitting, at a first time, the staging package for arrival at a plurality of listening nodes;
- receiving a cryptographically signed receipt from one or more listening nodes of the plurality of listening nodes, the cryptographically signed receipt providing cryptographic evidence of confirmed possession of the staging package prior to a second time; and
- programmatically restricting a broadcast of the release signal until the second time defined by the release schedule, the second time subsequent to the first time.

18. The method of claim 17, further comprising generating a verification manifest for inclusion in the staging package, the verification manifest defining a unique mathematical relationship between the verification hash and a plurality of secondary hashes corresponding to at least one of a plurality of different file formats of the data object.

19. The method of claim 17, further comprising executing a pre-commitment step prior to the first time by recording the verification hash and an associated timestamp on a persistent public ledger, providing a verifiable proof of the data object's entropy and existence prior to distribution.

20. The method of claim 17, wherein the transmitting of the staging package further comprises routing the staging package through a distribution authority, the distribution authority configured to function as a neutral intermediary that caches the encrypted payload and performs a synchronized broadcast of the release signal to the plurality of listening nodes at the second time.

21. The method of claim 20, further comprising transmitting a revocation signal to the distribution authority prior to the second time, the revocation signal configured to update a status registry that programmatically inhibits use of the decryption key.

22. The method of claim 17, wherein the transmitting of the staging package is performed via at least one of a persistent WebSocket and gRPC uplink, enabling a sub-millisecond transition from the staging package transmission to the transmission of the release signal.

23. The method of claim 17, further comprising injecting forensic metadata into the staging package, the forensic metadata defining at least one of authorized geographic and network-based coordinates required for the plurality of listening nodes to execute a decryption of the encrypted payload.

24. The method of claim 17, further comprising generating a plurality of independent key shards from the decryption key and distributing the independent key shards to a plurality of distinct entities, such that the decryption key is only reconstructible at the second time upon a threshold release of the independent key shards.

25. The method of claim 17, further comprising:

- receiving, at a distribution authority, a plurality of hardware-attested receipts from a corresponding plurality of listening nodes;
- validating the plurality of hardware-attested receipts against a hardware authority registry to confirm the legitimacy of a secure processing environment for each corresponding listening node;
- generating a distribution whitelist comprising a subset of the plurality of listening nodes from which a valid hardware-attested receipt was received prior to a specified cut-off time; and
- encapsulating the decryption key within a plurality of unique cryptographic wrappers corresponding to the listening nodes on the distribution whitelist, such that the release signal is programmatically rendered unusable by any node excluded from said distribution whitelist.

26. The method of claim 25, wherein the staging package further comprises an attested metadata block including a challenge-response nonce, and wherein generating the hardware-attested receipt comprises utilizing the secure processing environment to sign the challenge-response nonce, thereby providing cryptographic evidence that the staging of the encrypted payload is concurrent with the release schedule.

27. The method of claim 25, further comprising transmitting a compliance status of the plurality of listening nodes to a global state engine and enforcing, via the global state engine, a state-transition gate that programmatically invalidates at least one of a transaction and a state-change originating from a listening node identified by the compliance status as failing to provide a valid hardware-attested receipt prior to the second time.

28. The method of claim 17, further comprising cryptographically tethering the release signal to a verified domain name of the originator node via a persistent public record in a provenance registry, such that the plurality of listening nodes can independently authenticate the origin of the release signal at the second time.

29. The method of claim 17, further comprising generating a subscriber-specific metadata nonce for each of the plurality of listening nodes and performing a deterministic synthesis of the decryption key and the subscriber-specific metadata nonce to enable each listening node to generate a uniquely watermarked version of the data object upon decryption.

30. The method of claim 17, wherein the originator node and the distribution authority are a single integrated logical entity, such that the originator node directly manages the withholding and subsequent broadcast of the release signal to the plurality of listening nodes.

* * * * *